United States Patent [19]
Suzuki et al.

[11] Patent Number: 5,808,307
[45] Date of Patent: Sep. 15, 1998

[54] METHOD OF DETECTING ULTRAVIOLET LASER BEAM AND METHOD OF RECORDING INFORMATION

[75] Inventors: Masaaki Suzuki; Yoshinori Nakata; Hideaki Nagai; Takeshi Okutani, all of Sapporo; Masashi Murakami, Hadano; Nobuo Kushibiki, Fujisawa, all of Japan

[73] Assignees: Director-General of Agency of Industrial Science and Technology; Dow Corning Asia, Ltd., both of Japan

[21] Appl. No.: 795,205

[22] Filed: Feb. 5, 1997

[30] Foreign Application Priority Data

Feb. 7, 1996 [JP] Japan .................................. 8-045381
Feb. 7, 1996 [JP] Japan .................................. 8-045382

[51] Int. Cl.⁶ .............................. G01J 1/58; C09K 11/04; G01N 21/00
[52] U.S. Cl. ................. 250/372; 250/484.4; 252/301.34; 252/301.35
[58] Field of Search ................................ 250/372, 458.1, 250/461.1, 484.4; 252/301.34, 301.35

[56] References Cited

U.S. PATENT DOCUMENTS 5,658,494   8/1997   Bell et al. .......................... 252/301.34

FOREIGN PATENT DOCUMENTS

WO8805533   7/1988   WIPO ............................... 252/301.35

*Primary Examiner*—Michael J. Tokar
*Assistant Examiner*—Richard Hanig
*Attorney, Agent, or Firm*—Lorusso & Loud

[57] ABSTRACT

A method of detecting an ultraviolet laser beam, which includes irradiating a detector with the ultraviolet laser beam to produce photoluminescence from the detector, and sensing the photoluminescence. The detector includes a specific polysilmethylene compound or a specific polysiloxane compound. A method of recording an information is also disclosed which includes exposing a photosensitive layer to an ultraviolet laser beam according to the information. The photosensitive layer includes a specific polysilmethylene compound or a specific polysiloxane compound. By irradiating the exposed photosensitive layer to a reference ultraviolet laser beam, the recorded information is read.

15 Claims, No Drawings

METHOD OF DETECTING ULTRAVIOLET LASER BEAM AND METHOD OF RECORDING INFORMATION

BACKGROUND OF THE INVENTION

This invention relates to a method of detecting an ultraviolet laser beam and a method of recording an information, using a specific silicon-containing polymer.

Laser is now increasingly utilized in a wide variety of fields such as precision machining, medical treatment, chemical vapor deposition and information recording. Devices for carrying out the above operations using a laser beam are generally provided with an optical system through which the path of the laser beam is properly controlled. In the case of a laser beam having a wavelength in a visible region, such as argon laser, adjustment of an optical axis in the optical system can be carried out by inserting a white paper in the light path so that the path of the laser beam can be detected on the paper. In the case of an ultraviolet laser beam, however, the above technique cannot be adopted, so that, in the adjustment of the optical axis, a visible light laser has been hitherto replaced for the ultraviolet laser beam.

A polysilmethylene having a skeletal structure of C—Si, non-conjugated chains has been hitherto used as a pre-ceramic material, for example, as a binder for a silicon carbide ceramic material. The above also applies to a polysiloxane having O—Si recurring units.

SUMMARY OF THE INVENTION

It has now been found that a specific polysilmethylene compound and a specific polysiloxane compound generate photoluminescence when irradiated with an ultraviolet laser beam.

In accordance with one aspect of the present invention there is provided a method of detecting an ultraviolet laser beam, comprising irradiating a detector with said laser beam to produce photoluminescence from said detector, and sensing said photoluminescence, said detector comprising a silicon-containing polymer having a skeletal structure containing a recurring unit represented by the following formula (I) or (II):

wherein $R^1$ and $R^2$ stand, independently from each other, for a hydrogen atom or a lower alkyl group and $R^3$ and $R^4$ stand, independently from each other, for an aromatic group or a lower alkyl group with the proviso that at least one of $R^3$ and $R^4$ stands for an aromatic group,

wherein $R^5$ and $R^6$ stand, independently from each other, for an aromatic group or a lower alkyl group with the proviso that at least one of $R^5$ and $R^6$ stands for an aromatic group.

In another aspect, the present invention provides a method of recording an information, comprising exposing a recording medium to an ultraviolet laser beam according to said information, said recording medium including a photosensitive layer containing a silicon-containing polymer having a skeletal structure containing a recurring unit represented by the following formula (I) or (II):

wherein $R^1$ and $R^2$ stand, independently from each other, for a hydrogen atom or a lower alkyl group and $R^3$ and $R^4$ stand, independently from each other, for an aromatic group or a lower alkyl group with the proviso that at least one of $R^3$ and $R^4$ stands for an aromatic group,

wherein $R^5$ and $R^6$ stand, independently from each other, for an aromatic group or a lower alkyl group with the proviso that at least one of $R^5$ and $R^6$ stands for an aromatic group. The thus recorded information can be read by irradiating the exposed recording medium with a reference ultraviolet laser beam to generate luminescence.

It is an object of the present invention to provide a method which permits detection of an ultraviolet laser beam.

Another object of the present invention is to provide a method of recording an information.

Other objects, features and advantages of the present invention will become apparent from the detailed description of the preferred embodiments to follow.

DETAILED DESCRIPTION OF THE PREFERRED EMBODIMENTS OF THE INVENTION

In the silicon-containing polymer having recurring units represented by the above formula (I) or (II), the lower alkyl group is preferably one having 1–6 carbon atoms, more preferably 1–4 carbon atoms. The especially preferred alkyl group is a methyl group, an ethyl group, a propyl group and a butyl group. The aromatic group of the silicon-containing polymer is preferably an aryl group such as a phenyl group, a tolyl group or a xylyl group. The aromatic group can contain one or more substituents such as an alkyl group.

The silicon-containing polymer may be produced by the ring-open polymerization of a cyclic compound represented by the following formula (III) or (IV):

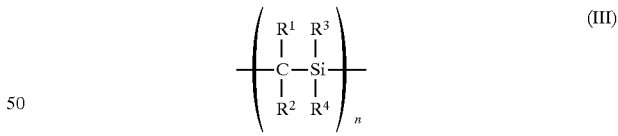

wherein $R^1$, $R^2$, $R^3$ and $R^4$ have the same meaning as above and n is an integer of 2–4, preferably 2,

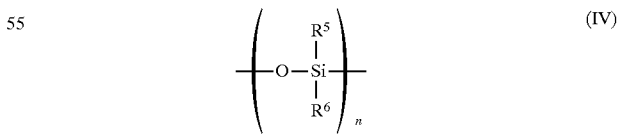

wherein $R^5$ and $R^6$ have the same meaning as above and n is an integer of 2–8, preferably 3–4.

The ring-open polymerization of the cyclic compound of the formula (III) may be carried out at a temperature of 100°–400° C., preferably 150°–300° C. and a pressure of $10^{-4}$ atm to 50 kg/cm²G, preferably $10^{-4}$ atm to 10 kg/cm²G, optionally, in the presence of a catalyst in a solvent.

The catalyst is preferably a copper catalyst such as metallic copper, e.g. a copper plate, copper powder, copper filament or copper wire; a copper alloy, e.g. bronze, cupronickel or brass; a cuprous compound, e.g. cuprous chloride, cuprous bromide, cuprous oxide or trimethylsilyl copper(I); or a cupric compound, e.g. cupric chloride, cupric bromide, cupric oxide, cupric nitrate, cupric sulfate, cupric acetate, cupric naphthenate, cupric oleate, cupric acetylacetonate, copper(II) bisethylenediamine chloride or copper(II) tetramine sulfate.

The solvent is preferably a high boiling point solvent such as diphenyl ether or diphenylsulfone and is suitably used in an amount of 100–5,000 parts by weight, preferably 500–1,000 parts by weight, per 100 parts by weight of the cyclic compound of the formula (III). After the termination of the reaction, unreacted compound is removed by washing with a chlorinated hydrocarbon such as ethylene chloride or an aromatic hydrocarbon such as toluene.

The ring-open polymerization of the compound of the formula (III) is disclosed in N. S. Nametkin et al, Akad. Nauk SSSR, 162, 824(1965); V. A. Poletaev et al, Akad. Nauk SSSR, 208, 1112(1973); and M. Murakami, Proceedings of Industrial Science Technology Research & Development, Second Silicon Polymer Material Symposium, page 99 (1994).

The ring-open polymerization of the cyclic compound of the formula (IV) may be carried out at a temperature of 100°–300° C., preferably 150°–250° C. and at an ambient pressure to 50 kg/cm$^2$G, preferably ambient pressure to 10 kg/cm$^2$G, optionally, in the presence of a catalyst in a solvent.

The catalyst is preferably an alkali metal or alkaline earth metal compound such as alkyllithium, alkoxylithium, lithium silanolate, lithium hydroxide or potassium silanolate. The solvent is preferably a high boiling point solvent such as diphenyl ether or diphenylsulfone and is suitably used in an amount of 100–1,000 parts by weight, preferably 200–500 parts by weight, per 100 parts by weight of the cyclic compound of the formula (IV). After the termination of the reaction, unreacted compound is removed by washing with a chlorinated hydrocarbon such as ethylene chloride or an aromatic hydrocarbon such as toluene.

The ring-open polymerization of the cyclic compound of the formula (IV) is disclosed in M. K. Lee, et al, Polymer, 34, 4882 (1993).

The amount of the catalyst used in the polymerization of the cyclic compound of the formula (III) or (IV) is one of the factors that influence upon the molecular weight and molecular weight distribution of the product. Generally, the catalyst is used in an amount of 1/100,000 to 1/5 mole, preferably 1/10,000 to 1/50 mole, per mole of the silicon atom of the cyclic compound or 1/1,000 to 20 parts by weight, preferably 1/100 to 2 parts by weight, per 100 parts by weight of the cyclic compound. In general, the smaller the catalyst concentration, the higher becomes the molecular weight.

The molecular weight of the silicon-containing polymer used in the present invention is not specifically limited as long as the polymer is in the form of a solid at room temperature. The polymer generally has a melting point of at least 100° C., more preferably at least 200° C. From the standpoint of moldability, it is preferred that the silicon-containing polymer having the recurring units (I) have a viscosity of 100–100,000 poises, more preferably 100–20,000 poises, when measured by a dynamic viscoelasticity measuring device at 370° C. and a frequency of 1 rad/sec. In the case of the polymer having the recurring units (II), the viscosity is preferably 100–100,000 poises, more preferably 100–20,000 poises, when measured by a dynamic viscoelasticity measuring device at 270° C. and a frequency of 1 rad/sec. The polymer has excellent thermal stability, mechanical strengths and heat-moldability.

By irradiating the above silicon-containing polymer with an ultraviolet laser beam such as KrF (240 nm) laser beam, a visible light (blue light) is generated by photoluminescence. The photoluminescence continues for about 4–10 seconds. The polymer may be in the form of a powder, a solvent solution or a shaped body such as a plate, a film or a block.

Thus, the polymer is suitably used as a detector of an ultraviolet laser beam. For example, by using a detector having a layer of the silicon-containing polymer, it is possible to adjust the optical axis, focal point, etc. of an optical system of a device using an ultraviolet laser beam.

The silicon-containing polymer used for detecting an ultraviolet laser beam may be in the form of a powder, a solvent solution or a shaped body such as a plate, a film or a block. A film or sheet of the polymer may be prepared by pressing pellets or powder of the polymer at a temperature of 200° C. or more. The polymer may be used by itself or in combination with other materials such a resin. Thus, fine particles of the silicon-containing polymer can be dispersed in a matrix of a resin in an amount of at least 1% by weight, preferably at least 5% by weight. Such a composite material may also be suitably used as the ultraviolet laser beam detector. If desired, a suitable support, such as a glass, a paper or a resin, may be used for supporting the silicon-containing polymer thereon.

Since the intensity of photoluminescence depends upon the intensity of the laser beam, it is possible to measure the intensity of the laser beam by measuring the intensity of the photoluminescence. The intensity of a laser beam is generally distributed in a Gaussian mode. The Gaussian distribution is altered due to scattering, fluctuation and refraction of the beam caused by temperature change, vibration, etc. of the environment. The laser beam detector according to the present invention is also effective in investigating such phenomena.

It has been found that a portion of a layer containing the silicon-containing polymer which has been once irradiated with a first ultraviolet laser beam generates, when irradiated with a second ultraviolet laser beam, luminescence characteristics different from those in another portion thereof which has not been irradiated with the first ultraviolet laser beam or which has been irradiated with an ultraviolet laser beam having an intensity different from that of the first ultraviolet laser beam. In other words, the silicon-containing polymer layer once exposed to an ultraviolet laser beam generates photoluminescence which varies according to the ultraviolet laser beam irradiation hysteresis thereof. By virtue of the above feature, the silicon-containing polymer may be utilized as a photosensitive material for recording an information such as an image information.

Namely, when a photosensitive layer containing the silicon-containing polymer is exposed to an ultraviolet laser beam modulated according to the information, the information is recorded or written in the photosensitive layer. The recorded information can be read by detecting the luminescence generated when the photosensitive layer is irradiated with a reference laser beam. While the reference laser beam may be different from the laser beam used in the recording of the information, it is convenient to use the same laser beam with different, very low intensity.

The following examples will further illustrate the present invention.

EXAMPLE 1

Diphenylsulfone (46 g) and diphenyl ether (5 g) were heated to 250° C. to obtain a melt, to which were added 5 g of 1,1,3,3-tetraphenyl-1,3-disilacyclobutane (a cyclic compound of the formula (III) in which $R^1$ and $R^2$ are each hydrogen, $R^3$ and $R^4$ are each phenyl and n is 2). The mixture was heated at 250° C. for 16 hours to polymerize the cyclic compound. The reaction mixture while still hot was filtered to separate polydiphenylsilmethylene. Unreacted 1,1,3,3- tetraphenyl-1,3-disilacyclobutane was then removed by extraction with toluene using a Soxlet extractor to leave, after drying, white powder of polydiphenylsilmethylene. This powder was pressed at 400° C. to obtain a film having a thickness of 200 μm. The film was irradiated with KrF laser (AQX-150, MPB Inc.) beam of a wavelength of 248 nm with a frequency of 5 Hz and an output power of 0.0869 W/cm$^2$. A strong luminescence was observed with naked eyes.

EXAMPLE 2

In a flask equipped with a thermometer, a reflux condenser and a stirrer, 25 g of hexaphenylcyclotrisiloxane (a cyclic compound of the formula (IV) in which $R^5$ and $R^6$ are each phenyl and n is 3) and 50 ml of diphenyl ether were charged and heated to 170° C., to which 0.65 ml of lithium triphenylsilanoate was added. The resulting mixture was then reacted at 170° C. for 1 hour with stirring. After being cooled to room temperature, the reaction mixture was neutralized with acetic acid to precipitate a product. The product was filtered, washed with toluene and dried at 200° C. under a reduced pressure to obtain polydiphenylsiloxane as white solids with a yield of 18 g. The white solids were pressed at 300° C. and a pressure of 50 kg/cm$^2$ to obtain a film having a thickness of 200 μm. The film was irradiated with KrF laser beam of a wavelength of 248 nm with a frequency of 5 Hz and an output power of 0.0869 W/cm$^2$. A strong luminescence was observed with naked eyes.

EXAMPLE 3

1,1,3,3-Tetraphenyl-1,3-disilacyclobutane (a cyclic compound of the formula (III) in which $R^1$ and $R^2$ are each hydrogen, $R^3$ and $R^4$ are each phenyl and n is 2) was subjected to deaeration and then charged in a glass ampoule. After sealing, the ampoule was heated at 300° C. for 16 hours to polymerize the cyclic compound. After being cooled to room temperature, the solids in the ampoule were taken out and pulverized in a mortar. The powder thus obtained was dispersed in toluene to dissolve unreacted 1,1,3,3-tetraphenyl-1,3-disilacyclobutane. The remaining solids were collected and dried to give white powder of polydiphenylsilmethylene. This powder was pressed at 400° C. and a pressure of 50 kg/cm$^2$ to obtain a film having a thickness of 200 μm. The film was fixed to a holder and set at a position in a laser beam path (distance from the light source: 1 m) and irradiated for 1 second with KrF eximer laser (wavelength of 248 nm) with a frequency of 5 Hz and an output power of 0.11 W/cm$^2$. A strong luminescence was observed with naked eyes. When the laser output power was decreased to 0.001 W/cm$^2$, no luminescence was observed with naked eyes. The intensity of the luminescence at an output power of 0.004 W/cm$^2$, 0.065 W/cm$^2$ and 0.11 W/cm$^2$ was recorded on a photographic film to compare the intensity of the luminescence on the photographs. It was revealed that the intensities at 0.11 W/cm$^2$ and 0.065 W/cm$^2$ were 2–3 times and 1.5–2 times that at 0.004 W/cm$^2$, respectively. A change, with time, of the intensity of photoluminescence caused by irradiation at 0.11 W/cm$^2$ and 5 Hz was measured. The intensity decreased to about 50% of the initial intensity 2 seconds after the irradiation. About 10 seconds after irradiation, the luminescence died.

EXAMPLE 4

The film obtained in Example 2 was fixed to a holder and set at a position in a laser beam path (distance from the light source: 1 m) and irradiated for 1 second with KrF eximer laser (wavelength of 248 nm) with a frequency of 5 Hz and an output power of 0.11 W/cm$^2$. A strong luminescence was observed with naked eyes. The intensity decreased to about 50% of the initial intensity 0.5 second after the irradiation. About 5 seconds after irradiation, the luminescence died.

EXAMPLE 5

The film obtained in Example 1 was fixed on a stage moveable along both X- and Y-axes. The stage bearing the film was displaced so that the film was exposed imagewise (an image of "+" pattern) to a KrF eximer laser beam (wavelength of 248 nm) with a frequency of 5 Hz and an output power of 0.11 W/cm$^2$. The film was thereafter scanned by the same laser beam at a reduced output power of 0.004 W/cm$^2$. Luminescence of the same "+" pattern was detected. It was confirmed that the recorded pattern was able to be read after the film had been stored for 3 months.

EXAMPLE 6

The film obtained in Example 2 was fixed on a stage moveable along both X- and Y-axes. The stage bearing the film was exposed imagewise (an image of "+" pattern) to a KrF eximer laser beam (wavelength of 248 nm) with a frequency of 5 Hz and an output power of 0.11 W/cm$^2$ using a mask. The film was thereafter scanned by the same laser beam at a reduced output power of 0.004 W/cm$^2$. Luminescence of the same "+" pattern was detected.

EXAMPLE 7

A pressure sensitive adhesive double coated tape was applied onto a surface of a glass plate. The polysilmethylene powder obtained in Example 1 was then applied on the upper side of the adhesive tape to form a layer of the powder supported on the glass plate with the adhesive tape. The resulting composite material was irradiated with KrF laser beam of a wavelength of 248 nm. A strong luminescence was observed with naked eyes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of detecting an ultraviolet laser beam, comprising irradiating a detector with said laser beam to produce photoluminescence from said detector, and sensing said photoluminescence, said detector comprising a silicon-containing polymer having a skeletal structure containing a recurring unit represented by the following formula (I) or (II):

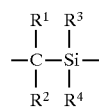
(I)

wherein $R^1$ and $R^2$ stand, independently from each other, for a hydrogen atom or a lower alkyl group and $R^3$ and $R^4$ stand, independently from each other, for an aromatic group or a lower alkyl group with the proviso that at least one of $R^3$ and $R^4$ stands for an aromatic group,

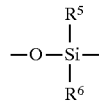
(II)

wherein $R^5$ and $R^6$ stand, independently from each other, for an aromatic group or a lower alkyl group with the proviso that at least one of $R^5$ and $R^6$ stands for an aromatic group.

2. A method as claimed in claim 1, wherein each of $R^3$ and $R^4$ stands for an aromatic group.

3. A method as claimed in claim 1, wherein each of $R^5$ and $R^6$ stands for an aromatic group.

4. A method as claimed in claim 1, wherein said detector is a molded body in the form of a film, a plate or a block.

5. A method as claimed in claim 4, wherein said molded body consists of said silicon-containing polymer.

6. A method as claimed in claim 5, wherein said molded body is made of a composite material containing particles of said silicon-containing polymer dispersed in a resin.

7. A method of recording an information, comprising exposing a recording medium to an ultraviolet laser beam according to said information, said recording medium including a photosensitive layer containing a silicon-containing polymer having a skeletal structure containing a recurring unit represented by the following formula (I) or

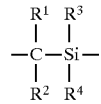
(I)

wherein $R^1$ and $R^2$ stand, independently from each other, for a hydrogen atom or a lower alkyl group and $R^3$ and $R^4$ stand, independently from each other, for an aromatic group or a lower alkyl group with the proviso that at least one of $R^3$ and $R^4$ stands for an aromatic group,

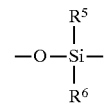
(II)

wherein $R^5$ and $R^6$ stand, independently from each other, for an aromatic group or a lower alkyl group with the proviso that at least one of $R^5$ and $R^6$ stands for an aromatic group.

8. A method as claimed in claim 7, wherein said ultraviolet laser beam is modulated according to said information.

9. A method as claimed in claim 7, wherein said photosensitive layer is exposed imagewise to said ultraviolet laser beam according to said information.

10. A method as claimed in claim 7, wherein each of $R^3$ and $R^4$ stands for an aromatic group.

11. A method as claimed in claim 7, wherein each of $R^5$ and $R^6$ stands for an aromatic group.

12. A method as claimed in claim 7, wherein said photosensitive layer is a molded body in the form of a film, a plate or a block.

13. A method as claimed in claim 12, wherein said molded body consists of said silicon-containing polymer.

14. A method as claimed in claim 12, wherein said molded body is made of a composite material containing particles of said silicon-containing polymer dispersed in a resin.

15. A method as claimed in claim 7, further comprising irradiating said exposed recording medium with a reference ultraviolet laser beam to generate luminescence, and detecting said luminescence to read said information.

\* \* \* \* \*

UNITED STATES PATENT AND TRADEMARK OFFICE
CERTIFICATE OF CORRECTION

PATENT NO. : 5,808,307
DATED : September 15, 1998
INVENTOR(S) : SUZUKI et al

It is certified that error appears in the above-indentified patent and that said Letters Patent is hereby corrected as shown below:

Col. 7, line 35, after "or" insert --(II):--

Signed and Sealed this

Tenth Day of August, 1999

Attest:

Q. TODD DICKINSON

*Attesting Officer*  *Acting Commissioner of Patents and Trademarks*